(12) United States Patent
Hildebrand (10) Patent No.: US 9,311,634 B1
(45) Date of Patent: *Apr. 12, 2016

(54) SYSTEMS AND METHODS FOR AUTOMATIC BILL PAY ENROLLMENT

(71) Applicant: United Services Automobile Association (USAA), San Antonio, TX (US)

(72) Inventor: Marc W Hildebrand, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/624,672

(22) Filed: Sep. 21, 2012

Related U.S. Application Data (63) Continuation of application No. 12/241,433, filed on Sep. 30, 2008, now Pat. No. 8,275,710.

(51) Int. Cl.
*G06Q 20/14* (2012.01)

(52) U.S. Cl.
CPC .................................. *G06Q 20/14* (2013.01)

(58) Field of Classification Search
CPC combination set(s) only.
See application file for complete search history.

(56) References Cited

U.S. PATENT DOCUMENTS

| | | |
|---|---|---|
| 3,341,820 A | 9/1967 | Grillmeier, Jr. |
| 3,576,972 A | 5/1971 | Wood et al. |
| 3,593,913 A | 7/1971 | Bremer |
| 3,620,553 A | 11/1971 | Donovan |
| 3,648,242 A | 3/1972 | Grosbard |
| 3,816,943 A | 6/1974 | Henry |
| 4,002,356 A | 1/1977 | Weidmann |
| 4,060,711 A | 11/1977 | Buros |
| 4,128,202 A | 12/1978 | Buros |
| 4,136,471 A | 1/1979 | Austin |
| 4,205,780 A | 6/1980 | Burns et al. |
| 4,264,808 A | 4/1981 | Owens et al. |
| 4,305,216 A | 12/1981 | Skelton |
| 4,321,672 A | 3/1982 | Braun et al. |
| 4,523,330 A | 6/1985 | Cain |
| 4,636,099 A | 1/1987 | Goldstone |
| 4,640,413 A | 2/1987 | Kaplan et al. |
| 4,644,144 A | 2/1987 | Chandek et al. |
| 4,722,444 A | 2/1988 | Murphy et al. |
| 4,727,435 A | 2/1988 | Otani et al. |
| 4,774,663 A | 9/1988 | Musmanno et al. |
| 4,790,475 A | 12/1988 | Griffin |

(Continued)

FOREIGN PATENT DOCUMENTS

EP 0984410 A1 3/2000

OTHER PUBLICATIONS

BankServ, Press Release for "BankServ Announces New Remote Deposit Product Integrated With QuickBooks," PRNews, 3 pages, Jul. 6, 2006.

(Continued)

*Primary Examiner* — Luna Champagne
(74) *Attorney, Agent, or Firm* — Brinks Gilson & Lione (57) ABSTRACT

A system for bill pay enrollment may comprise at least one subsystem that scans a paper a bill into a digital image, at least one subsystem that recognizes information on the digital image, and at least one subsystem that uses at least some of the recognized information to enroll a payee into a bill pay system.

19 Claims, 6 Drawing Sheets

(56) References Cited

U.S. PATENT DOCUMENTS

| | | |
|---|---|---|
| 4,806,780 A | 2/1989 | Yamamoto et al. |
| 4,837,693 A | 6/1989 | Schotz |
| 4,890,228 A | 12/1989 | Longfield |
| 4,927,071 A | 5/1990 | Wood |
| 4,934,587 A | 6/1990 | McNabb |
| 4,960,981 A | 10/1990 | Benton et al. |
| 4,975,735 A | 12/1990 | Bright et al. |
| 5,022,683 A | 6/1991 | Barbour |
| 5,053,607 A | 10/1991 | Carlson et al. |
| 5,157,620 A | 10/1992 | Shaar |
| 5,159,548 A | 10/1992 | Caslavka |
| 5,191,525 A | 3/1993 | LeBrun et al. |
| 5,220,501 A | 6/1993 | Lawlor et al. |
| 5,237,159 A | 8/1993 | Stephens et al. |
| 5,265,008 A | 11/1993 | Benton et al. |
| 5,321,816 A | 6/1994 | Rogan et al. |
| 5,350,906 A | 9/1994 | Brody et al. |
| 5,373,550 A | 12/1994 | Campbell et al. |
| 5,419,588 A | 5/1995 | Wood |
| 5,422,467 A | 6/1995 | Graef et al. |
| 5,504,538 A | 4/1996 | Tsujihara et al. |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green et al. |
| 5,610,726 A | 3/1997 | Nonoshita et al. |
| 5,611,028 A | 3/1997 | Shibasaki et al. |
| 5,630,073 A | 5/1997 | Nolan |
| 5,668,897 A | 9/1997 | Stolfo |
| 5,673,320 A | 9/1997 | Ray et al. |
| 5,677,955 A | 10/1997 | Doggett et al. |
| 5,679,938 A | 10/1997 | Templeton et al. |
| 5,680,611 A | 10/1997 | Rail et al. |
| 5,691,524 A | 11/1997 | Josephson |
| 5,737,440 A | 4/1998 | Kunkler |
| 5,751,842 A | 5/1998 | Riach et al. |
| 5,830,609 A | 11/1998 | Warner et al. |
| 5,832,463 A | 11/1998 | Funk |
| 5,863,075 A | 1/1999 | Rich et al. |
| 5,870,456 A | 2/1999 | Rogers |
| 5,870,724 A | 2/1999 | Lawlor et al. |
| 5,878,337 A | 3/1999 | Joao et al. |
| 5,897,625 A | 4/1999 | Gustin et al. |
| 5,903,878 A | 5/1999 | Talati et al. |
| 5,903,881 A | 5/1999 | Schrader et al. |
| 5,910,988 A | 6/1999 | Ballard |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill et al. |
| 5,982,918 A | 11/1999 | Mennie et al. |
| 5,987,439 A | 11/1999 | Gustin et al. |
| 6,012,048 A | 1/2000 | Gustin et al. |
| 6,021,202 A | 2/2000 | Anderson et al. |
| 6,029,887 A | 2/2000 | Furuhashi et al. |
| 6,030,000 A | 2/2000 | Diamond |
| 6,032,137 A | 2/2000 | Ballard |
| 6,038,553 A | 3/2000 | Hyde, Jr. |
| 6,073,119 A | 6/2000 | Bornemisza-Wahr et al. |
| 6,085,168 A | 7/2000 | Mori et al. |
| 6,097,834 A | 8/2000 | Krouse et al. |
| 6,097,885 A | 8/2000 | Rayner |
| 6,105,865 A | 8/2000 | Hardesty |
| 6,145,738 A | 11/2000 | Stinson et al. |
| 6,151,426 A | 11/2000 | Lee et al. |
| 6,159,585 A | 12/2000 | Rittenhouse |
| 6,170,744 B1 | 1/2001 | Lee et al. |
| 6,188,506 B1 | 2/2001 | Kaiserman et al. |
| 6,189,785 B1 | 2/2001 | Lowery |
| 6,199,055 B1 | 3/2001 | Kara et al. |
| 6,243,689 B1 | 6/2001 | Norton |
| 6,278,983 B1 | 8/2001 | Ball |
| 6,282,826 B1 | 9/2001 | Richards |
| 6,285,991 B1 | 9/2001 | Powar |
| 6,304,860 B1 | 10/2001 | Martin, Jr. et al. |
| 6,314,452 B1 | 11/2001 | Dekel et al. |
| 6,317,727 B1 | 11/2001 | May |
| 6,339,658 B1 | 1/2002 | Moccagatta et al. |
| 6,363,164 B1 | 3/2002 | Jones et al. |
| 6,390,362 B1 | 5/2002 | Martin |
| 6,397,196 B1 | 5/2002 | Kravetz et al. |
| 6,413,305 B1 | 7/2002 | Mehta et al. |
| 6,417,869 B1 | 7/2002 | Do |
| 6,425,017 B1 | 7/2002 | Dievendorff et al. |
| 6,429,952 B1 | 8/2002 | Olbricht |
| 6,449,397 B1 | 9/2002 | Che-Chu |
| 6,450,403 B1 | 9/2002 | Martens et al. |
| 6,464,134 B1 | 10/2002 | Page |
| 6,470,325 B1 | 10/2002 | Leemhuis |
| 6,505,178 B1 | 1/2003 | Flenley |
| 6,574,609 B1 | 6/2003 | Downs et al. |
| 6,578,760 B1 | 6/2003 | Otto |
| 6,587,837 B1 | 7/2003 | Spagna et al. |
| 6,609,200 B2 | 8/2003 | Anderson et al. |
| 6,643,416 B1 | 11/2003 | Daniels et al. |
| 6,661,910 B2 | 12/2003 | Jones et al. |
| 6,672,452 B1 | 1/2004 | Alves et al. |
| 6,682,452 B2 | 1/2004 | Quintus |
| 6,695,204 B1 | 2/2004 | Stinson et al. |
| 6,726,097 B2 | 4/2004 | Graef et al. |
| 6,728,397 B2 | 4/2004 | McNeal |
| 6,742,128 B1 | 5/2004 | Joiner |
| 6,755,340 B1 | 6/2004 | Voss et al. |
| 6,781,962 B1 | 8/2004 | Williams et al. |
| 6,786,398 B1 | 9/2004 | Stinson et al. |
| 6,789,054 B1 | 9/2004 | Makhlouf |
| 6,829,704 B2 | 12/2004 | Zhang et al. |
| 6,844,885 B2 | 1/2005 | Anderson et al. |
| 6,856,965 B1 | 2/2005 | Stinson et al. |
| 6,883,140 B1 | 4/2005 | Acker et al. |
| 6,902,105 B2 | 6/2005 | Koakutsu |
| 6,913,188 B2 | 7/2005 | Wong et al. |
| 6,931,591 B1 | 8/2005 | Brown et al. |
| 6,934,719 B2 | 8/2005 | Nally et al. |
| 6,957,770 B1 | 10/2005 | Robinson |
| 6,961,689 B1 | 11/2005 | Greenberg |
| 6,970,843 B1 | 11/2005 | Forte |
| 6,993,507 B2 | 1/2006 | Meyer et al. |
| 6,996,263 B2 | 2/2006 | Jones et al. |
| 6,999,943 B1 | 2/2006 | Johnson et al. |
| 7,004,382 B2 | 2/2006 | Sandru |
| 7,010,507 B1 | 3/2006 | Anderson et al. |
| 7,016,704 B2 | 3/2006 | Pallakoff |
| 7,039,048 B1 | 5/2006 | Monta et al. |
| 7,062,768 B2 | 6/2006 | Kubo et al. |
| 7,107,243 B1 * | 9/2006 | McDonald et al. ............ 705/40 |
| 7,113,925 B2 | 9/2006 | Waserstein et al. |
| 7,114,649 B2 | 10/2006 | Nelson et al. |
| 7,139,594 B2 | 11/2006 | Nagatomo |
| 7,140,539 B1 | 11/2006 | Crews et al. |
| 7,163,347 B2 | 1/2007 | Lugg |
| 7,181,430 B1 | 2/2007 | Buchanan et al. |
| 7,197,173 B2 | 3/2007 | Jones et al. |
| 7,200,255 B2 | 4/2007 | Jones et al. |
| 7,216,106 B1 | 5/2007 | Buchanan et al. |
| 7,249,076 B1 | 7/2007 | Pendleton et al. |
| 7,290,034 B2 | 10/2007 | Budd et al. |
| 7,299,970 B1 | 11/2007 | Ching |
| 7,299,979 B2 | 11/2007 | Phillips et al. |
| 7,301,662 B2 | 11/2007 | Mifune |
| 7,313,543 B1 | 12/2007 | Crane et al. |
| 7,321,874 B2 | 1/2008 | Dilip et al. |
| 7,321,875 B2 | 1/2008 | Dilip et al. |
| 7,325,725 B2 | 2/2008 | Foss, Jr. |
| 7,343,320 B1 | 3/2008 | Treyz et al. |
| 7,349,566 B2 | 3/2008 | Jones et al. |
| 7,370,014 B1 * | 5/2008 | Vasavada et al. ............ 705/40 |
| 7,377,425 B1 | 5/2008 | Ma et al. |
| 7,379,978 B2 | 5/2008 | Anderson et al. |
| 7,385,631 B2 | 6/2008 | Maeno et al. |
| 7,386,511 B2 | 6/2008 | Buchanan et al. |

(56) References Cited

U.S. PATENT DOCUMENTS

| | | | |
|---|---|---|---|
| 7,391,897 B2 | 6/2008 | Jones et al. | |
| 7,391,934 B2 | 6/2008 | Goodall et al. | |
| 7,392,935 B2 | 7/2008 | Byrne et al. | |
| 7,421,107 B2 | 9/2008 | Lugg | |
| 7,440,924 B2 | 10/2008 | Buchanan et al. | |
| 7,447,347 B2 | 11/2008 | Weber | |
| 7,460,108 B2 | 12/2008 | Tamura | |
| 7,461,779 B2 | 12/2008 | Ramachandran | |
| 7,461,780 B2 | 12/2008 | Potts et al. | |
| 7,477,923 B2 | 1/2009 | Wallmark et al. | |
| 7,480,382 B2 | 1/2009 | Dunbar et al. | |
| 7,489,953 B2 | 2/2009 | Griffin | |
| 7,490,242 B2 | 2/2009 | Torres et al. | |
| 7,497,429 B2 | 3/2009 | Reynders et al. | |
| 7,506,261 B2 | 3/2009 | Satou et al. | |
| 7,512,564 B1 | 3/2009 | Geer | |
| 7,536,440 B2 | 5/2009 | Budd et al. | |
| 7,548,641 B2 | 6/2009 | Gilson et al. | |
| 7,609,873 B2 | 10/2009 | Foth et al. | |
| 7,620,231 B2 * | 11/2009 | Jones et al. | 382/137 |
| 7,647,275 B2 | 1/2010 | Jones | |
| 7,672,940 B2 | 3/2010 | Viola et al. | |
| 7,702,588 B2 | 4/2010 | Gilder et al. | |
| 7,933,826 B2 * | 4/2011 | Kitchen et al. | 705/37 |
| 8,073,233 B2 * | 12/2011 | Kanda | 382/133 |
| 8,156,045 B2 * | 4/2012 | Rebenack et al. | 705/40 |
| 2001/0014881 A1 | 8/2001 | Drummond et al. | |
| 2001/0018739 A1 | 8/2001 | Anderson et al. | |
| 2001/0027994 A1 | 10/2001 | Hayashida | |
| 2001/0037297 A1 | 11/2001 | McNair | |
| 2001/0042171 A1 | 11/2001 | Vermeulen | |
| 2001/0043748 A1 | 11/2001 | Wesolkowski et al. | |
| 2001/0047330 A1 | 11/2001 | Gephart et al. | |
| 2001/0054020 A1 | 12/2001 | Barth et al. | |
| 2002/0001393 A1 | 1/2002 | Jones et al. | |
| 2002/0016763 A1 | 2/2002 | March | |
| 2002/0032656 A1 | 3/2002 | Chen | |
| 2002/0052841 A1 | 5/2002 | Guthrie et al. | |
| 2002/0052853 A1 | 5/2002 | Munoz | |
| 2002/0065786 A1 | 5/2002 | Martens et al. | |
| 2002/0072974 A1 | 6/2002 | Pugliese et al. | |
| 2002/0075524 A1 | 6/2002 | Blair et al. | |
| 2002/0084321 A1 | 7/2002 | Martens et al. | |
| 2002/0116329 A1 | 8/2002 | Serbetcioglu et al. | |
| 2002/0118891 A1 | 8/2002 | Rudd et al. | |
| 2002/0120562 A1 | 8/2002 | Opiela et al. | |
| 2002/0128967 A1 | 9/2002 | Meyer et al. | |
| 2002/0138522 A1 | 9/2002 | Muralidhar et al. | |
| 2002/0147798 A1 | 10/2002 | Huang | |
| 2002/0150279 A1 | 10/2002 | Scott et al. | |
| 2002/0152161 A1 | 10/2002 | Aoike | |
| 2002/0152164 A1 | 10/2002 | Dutta et al. | |
| 2002/0152169 A1 | 10/2002 | Dutta et al. | |
| 2002/0171820 A1 | 11/2002 | Okamura | |
| 2002/0178112 A1 | 11/2002 | Goeller et al. | |
| 2003/0005326 A1 | 1/2003 | Flemming | |
| 2003/0023557 A1 | 1/2003 | Moore | |
| 2003/0038227 A1 | 2/2003 | Sesek et al. | |
| 2003/0055756 A1 | 3/2003 | Allan | |
| 2003/0055776 A1 | 3/2003 | Samuelson | |
| 2003/0075916 A1 | 4/2003 | Gorski | |
| 2003/0081824 A1 | 5/2003 | Mennie et al. | |
| 2003/0105688 A1 | 6/2003 | Brown et al. | |
| 2003/0139999 A1 | 7/2003 | Rowe | |
| 2003/0167225 A1 | 9/2003 | Adams | |
| 2003/0191615 A1 | 10/2003 | Bailey et al. | |
| 2003/0191711 A1 | 10/2003 | Jamison et al. | |
| 2003/0191869 A1 | 10/2003 | Williams et al. | |
| 2003/0200174 A1 | 10/2003 | Star | |
| 2004/0010466 A1 | 1/2004 | Anderson | |
| 2004/0012496 A1 | 1/2004 | De Souza et al. | |
| 2004/0024626 A1 | 2/2004 | Bruijning | |
| 2004/0024708 A1 | 2/2004 | Masuda et al. | |
| 2004/0057697 A1 | 3/2004 | Renzi et al. | |
| 2004/0058705 A1 | 3/2004 | Morgan et al. | |
| 2004/0066031 A1 | 4/2004 | Wong et al. | |
| 2004/0069841 A1 | 4/2004 | Wong et al. | |
| 2004/0078299 A1 | 4/2004 | Down-Logan et al. | |
| 2004/0080795 A1 | 4/2004 | Bean et al. | |
| 2004/0093303 A1 | 5/2004 | Picciallo | |
| 2004/0093305 A1 | 5/2004 | Kight et al. | |
| 2004/0103296 A1 | 5/2004 | Harp et al. | |
| 2004/0109596 A1 | 6/2004 | Doran | |
| 2004/0122754 A1 | 6/2004 | Stevens | |
| 2004/0138974 A1 | 7/2004 | Shimamura et al. | |
| 2004/0148235 A1 | 7/2004 | Craig et al. | |
| 2004/0158549 A1 | 8/2004 | Matena et al. | |
| 2004/0165096 A1 | 8/2004 | Maeno et al. | |
| 2004/0170259 A1 | 9/2004 | Park | |
| 2004/0210515 A1 | 10/2004 | Hughes | |
| 2004/0236647 A1 | 11/2004 | Acharya | |
| 2004/0236688 A1 | 11/2004 | Bozeman | |
| 2004/0245324 A1 | 12/2004 | Chen | |
| 2004/0252679 A1 | 12/2004 | Williams et al. | |
| 2004/0260636 A1 | 12/2004 | Marceau et al. | |
| 2004/0267666 A1 | 12/2004 | Minami et al. | |
| 2005/0033645 A1 | 2/2005 | Duphily | |
| 2005/0033685 A1 | 2/2005 | Reyes | |
| 2005/0033690 A1 | 2/2005 | Antognini et al. | |
| 2005/0033695 A1 | 2/2005 | Minowa | |
| 2005/0038754 A1 | 2/2005 | Geist et al. | |
| 2005/0044042 A1 | 2/2005 | Mendiola et al. | |
| 2005/0044577 A1 | 2/2005 | Jerding et al. | |
| 2005/0049950 A1 | 3/2005 | Johnson | |
| 2005/0075969 A1 | 4/2005 | Nielson et al. | |
| 2005/0078336 A1 | 4/2005 | Ferlitsch | |
| 2005/0086140 A1 | 4/2005 | Ireland et al. | |
| 2005/0086168 A1 | 4/2005 | Alvarez et al. | |
| 2005/0091161 A1 | 4/2005 | Gustin et al. | |
| 2005/0096992 A1 | 5/2005 | Geisel et al. | |
| 2005/0097046 A1 | 5/2005 | Singfield | |
| 2005/0108164 A1 | 5/2005 | Salafia et al. | |
| 2005/0108168 A1 | 5/2005 | Halpin et al. | |
| 2005/0131820 A1 | 6/2005 | Rodriguez et al. | |
| 2005/0149436 A1 | 7/2005 | Elterich | |
| 2005/0168566 A1 | 8/2005 | Tada et al. | |
| 2005/0171899 A1 | 8/2005 | Dunn et al. | |
| 2005/0171907 A1 | 8/2005 | Lewis | |
| 2005/0177499 A1 | 8/2005 | Thomas | |
| 2005/0177518 A1 | 8/2005 | Brown | |
| 2005/0182710 A1 | 8/2005 | Andersson et al. | |
| 2005/0188306 A1 | 8/2005 | Mackenzie | |
| 2005/0209961 A1 | 9/2005 | Michelsen et al. | |
| 2005/0228733 A1 | 10/2005 | Bent et al. | |
| 2005/0252955 A1 | 11/2005 | Sugai et al. | |
| 2005/0267843 A1 | 12/2005 | Acharya et al. | |
| 2005/0269412 A1 | 12/2005 | Chiu et al. | |
| 2005/0278250 A1 | 12/2005 | Zair | |
| 2005/0281471 A1 | 12/2005 | LeComte | |
| 2005/0289030 A1 | 12/2005 | Smith | |
| 2006/0004660 A1 | 1/2006 | Pranger | |
| 2006/0025697 A1 | 2/2006 | Kurzweil et al. | |
| 2006/0039629 A1 | 2/2006 | Li et al. | |
| 2006/0047593 A1 | 3/2006 | Naratil et al. | |
| 2006/0053056 A1 | 3/2006 | Alspach-Goss et al. | |
| 2006/0059085 A1 | 3/2006 | Tucker | |
| 2006/0080245 A1 | 4/2006 | Bahl et al. | |
| 2006/0085357 A1 | 4/2006 | Pizarro | |
| 2006/0102704 A1 | 5/2006 | Reynders et al. | |
| 2006/0106691 A1 | 5/2006 | Sheaffer | |
| 2006/0106717 A1 | 5/2006 | Randle et al. | |
| 2006/0110063 A1 | 5/2006 | Weiss | |
| 2006/0112013 A1 | 5/2006 | Maloney | |
| 2006/0115110 A1 | 6/2006 | Rodriguez et al. | |
| 2006/0115141 A1 | 6/2006 | Koakutsu et al. | |
| 2006/0116949 A1 | 6/2006 | Wehunt et al. | |
| 2006/0118613 A1 | 6/2006 | McMann et al. | |
| 2006/0122932 A1 * | 6/2006 | Birtwell et al. | 705/40 |
| 2006/0144924 A1 | 7/2006 | Stover | |
| 2006/0144950 A1 | 7/2006 | Johnson | |
| 2006/0161501 A1 | 7/2006 | Waserstein et al. | |
| 2006/0206506 A1 | 9/2006 | Fitzpatrick | |
| 2006/0214940 A1 | 9/2006 | Kinoshita et al. | |
| 2006/0229976 A1 | 10/2006 | Jung et al. | |

(56) References Cited

U.S. PATENT DOCUMENTS

| | | | |
|---|---|---|---|
| 2006/0229986 | A1 | 10/2006 | Corder |
| 2006/0238503 | A1 | 10/2006 | Smith et al. |
| 2006/0242062 | A1 | 10/2006 | Peterson et al. |
| 2006/0242063 | A1 | 10/2006 | Peterson et al. |
| 2006/0249567 | A1 | 11/2006 | Byrne et al. |
| 2006/0277139 | A1* | 12/2006 | Poltorak ............... 705/38 |
| 2006/0279628 | A1 | 12/2006 | Fleming |
| 2006/0282383 | A1 | 12/2006 | Doran |
| 2007/0016796 | A1 | 1/2007 | Singhal |
| 2007/0019243 | A1 | 1/2007 | Sato et al. |
| 2007/0022053 | A1 | 1/2007 | Waserstein et al. |
| 2007/0031022 | A1 | 2/2007 | Frew et al. |
| 2007/0050292 | A1 | 3/2007 | Yarbrough |
| 2007/0058851 | A1 | 3/2007 | Quine et al. |
| 2007/0063016 | A1 | 3/2007 | Myatt et al. |
| 2007/0075772 | A1 | 4/2007 | Kokubo et al. |
| 2007/0077921 | A1 | 4/2007 | Hayashi et al. |
| 2007/0080207 | A1 | 4/2007 | Williams |
| 2007/0082700 | A1 | 4/2007 | Landschaft et al. |
| 2007/0084911 | A1 | 4/2007 | Crowell |
| 2007/0086642 | A1 | 4/2007 | Foth et al. |
| 2007/0086643 | A1 | 4/2007 | Spier et al. |
| 2007/0094088 | A1 | 4/2007 | Mastie et al. |
| 2007/0100748 | A1 | 5/2007 | Dheer et al. |
| 2007/0118470 | A1 | 5/2007 | Warren et al. |
| 2007/0129955 | A1 | 6/2007 | Dalmia et al. |
| 2007/0136198 | A1 | 6/2007 | Foth et al. |
| 2007/0140594 | A1 | 6/2007 | Franklin et al. |
| 2007/0143208 | A1 | 6/2007 | Varga |
| 2007/0156438 | A1 | 7/2007 | Popadic et al. |
| 2007/0168265 | A1 | 7/2007 | Rosenberger |
| 2007/0171288 | A1 | 7/2007 | Inoue et al. |
| 2007/0194102 | A1 | 8/2007 | Cohen et al. |
| 2007/0241179 | A1 | 10/2007 | Davis et al. |
| 2007/0255652 | A1 | 11/2007 | Tumminaro et al. |
| 2007/0258634 | A1 | 11/2007 | Simonoff |
| 2008/0002911 | A1 | 1/2008 | Eisen et al. |
| 2008/0015946 | A1* | 1/2008 | Enroughty ............... 705/26 |
| 2008/0021802 | A1 | 1/2008 | Pendleton |
| 2008/0040280 | A1 | 2/2008 | Davis et al. |
| 2008/0059376 | A1 | 3/2008 | Davis et al. |
| 2008/0071721 | A1 | 3/2008 | Wang et al. |
| 2008/0080760 | A1 | 4/2008 | Ronca et al. |
| 2008/0117991 | A1 | 5/2008 | Peddireddy et al. |
| 2008/0119178 | A1 | 5/2008 | Peddireddy et al. |
| 2008/0133411 | A1 | 6/2008 | Jones et al. |
| 2008/0156438 | A1 | 7/2008 | Stumphauzer et al. |
| 2008/0189208 | A1* | 8/2008 | Wilkie ............... 705/40 |
| 2008/0247629 | A1 | 10/2008 | Gilder et al. |
| 2008/0275816 | A1* | 11/2008 | Hazlehurst ............... 705/40 |
| 2009/0108080 | A1 | 4/2009 | Meyer et al. |
| 2009/0141962 | A1 | 6/2009 | Borgia et al. |
| 2009/0171825 | A1 | 7/2009 | Roman |
| 2009/0173781 | A1 | 7/2009 | Ramachandran |
| 2009/0252437 | A1 | 10/2009 | Li et al. |
| 2009/0281904 | A1 | 11/2009 | Pharris |
| 2009/0313167 | A1 | 12/2009 | Dujari et al. |
| 2010/0007899 | A1 | 1/2010 | Lay |

OTHER PUBLICATIONS

BankServ, "Remote Deposit," 3 pages, no date.
Bank Systems & Technology, "Are You Winning in the Payments World?," 4 pages, May 1, 2006.
Blue Mountain Consulting, "Welcome," 3 pages, Apr. 29, 2005.
Board of Governors of the Federal Reserve System, "Availability of Funds and Collection of Checks," 12 CFR Part 229, Regulation CC, 89 pages, Dec. 22, 2003.
Board of Governors of the Federal Reserve System, "Report to the Congress on the Check Clearing for the 21st Century Act of 2003," 60 pages, Apr. 2007.
Bruene, Jim, "CheckFree to Enable In-Home Remote Check Deposits for Consumers and Small Businesses," NetBanker, 3 pages, Feb. 5, 2008.
Bruene, Jim, "Digital Federal Credit Union and Four Others Offer Consumer Remote Deposit Capture Through EasCorp," NetBanker, 3 pages, Apr. 13, 2008.
Bruene, Jim, "Optimized for the Net: Scan-and-Pay Bill Presentment," NetBanker, 3 pages, Jun. 8, 1999.
Budnitz, Mark, "New Check 21 Act Effective Oct. 28, 2004; Banks No Longer Will Return Original Cancelled Checks," 19 pages, no date.
Chiang, Chuck, "Remote Banking Offered," The Bulletin, 2 pages, Feb. 1, 2006.
CNN.com, "Scan Deposit Checks From Home," 3 pages, Feb. 7, 2008.
Co-Op Financial Services, Press Release for "Co-Op Adds Home Deposit Capabilities to Suite of Check Imaging Products," 2 pages, Mar. 5, 2008.
Costanzo, Chris, "Remote Check Deposit: Wells Captures a New Checking Twist," Bank Technology News, 2 pages, May 2005.
Craig, Ben, "Resisting Electronic Payment Systems: Burning Down the House?," Federal Reserve Bank of Cleveland, 4 pages, Jul. 1999.
Creative Payment Solutions, Inc., "WebSolution," 1 page, 2008.
Credit Union Journal, "AFCU Averaging 80 Deposit@Home Transactions Per Day," vol. 9, Iss. 32, 2 pages, Aug. 15, 2005.
Credit Union Journal, "The Ramifications of Remote Deposit Capture Success," 1 page, Apr. 14, 2008.
DepositNow, "DepositNow: What's the Difference?," 1 page, 2006.
Digital Federal Credit Union, "PC Deposit—Deposit Checks From Home!," 2 pages, Jan. 2008.
Digital Transactions, "An ACH-Image Proposal for Checks Roils Banks and Networks," 3 pages, May 26, 2006.
eCU Technologies, "UPost® Remote Deposit Solution," 1 page, no date.
Fest, Glen, "Patently Unaware," Bank Technology News, 5 pages, Apr. 2006.
Furst, Karen et al., "Internet Banking: Developments and Prospects," Office of the Comptroller of the Currency, Economic and Policy Analysis Working Paper 2000-9, 60 pages, Sep. 2000.
Mitek Systems, "ImageNet Mobile Deposit," 2 pages, no date.
National Automated Clearinghouse Association, "Retail Payment Systems: Payment Instruments, Clearing, and Settlement: The Automated Clearinghouse," 3 pages, downloaded Dec. 13, 2005.
108th Congress, "Check Clearing for the 21st Century Act," Public Law 108-100, H.R. 1474, 117 STAT. 1177-1194, Oct. 28, 2003.
Oxley, Michael G., "Check Clearing for the 21st Century Act," Report 108-132, to accompany H.R. 1474, House of Representatives, Committee on Financial Services, 108th Congress, 1st Session; 20 pages, Jun. 2, 2003.
Oxley, Michael G., "Check Clearing for the 21st Century Act," Report 108-291, to accompany H.R. 1474, House of Representatives, Committee of Conference, 108th Congress, 1st Session; 27 pages, Oct. 1, 2003.
PNC Bank, "PNC Bank to Offer Ease of Online Deposit Service Integrated With QuickBooks to Small Businesses," PRWEB, 2 pages, Jul. 24, 2006.
RemoteDepositCapture.com, "Welcome," 5 pages, Apr. 20, 2006.
Rivlin, Alice M. et al., "The Federal Reserve in the Payments Mechanism," Federal Reserve System, 41 pages, Jan. 1998.
Shelby, Richard C., "Check Truncation Act of 2003," Report 108-79, to accompany S. 1334, Senate, Committee on Banking, Housing, and Urban Affairs, 108th Congress, 1st Session, Calendar No. 168, 9 pages, Jun. 25, 2003.
The Association of German Banks, "SEPA 2008: Uniform Payment Instruments for Europe," 42 pages, 2007.
U.S. Appl. No. 09/506,434, Response to Office Action mailed Nov. 27, 2007, 5 pages, Feb. 20, 2008.
Wells Fargo & Company, News Release for "The New Wells Fargo Electronic Deposit Services Break Through Banking Boundaries in the Age of Check 21," 1 page, Mar. 28, 2005.
Wells Fargo, "Remote Deposit," 1 page, 2008.
WindowsForDevices.com, "Software Lets Camera Phone Users Deposit Checks, Pay Bills," 3 pages, Jan. 29, 2008.
"Affinity Announces Online Deposit: New Service Allows Members to Deposit Checks Online", Affinity Federal Credit Union, Aug. 4, 2005, 1 page, Basking Ridge, New Jersey.

(56) References Cited

OTHER PUBLICATIONS

Anderson, Milton M., "FSML and Echeck", W3C Signed-XML Workshop, Apr. 15-16, 1999, pp. 1-17, Financial Services Technology Consortium.

András Kornai, K.M. Mohiuddin et al., "Recognition of Cursive Writing on Personal Checks", Proceedings of International Workshop on the Frontiers in Handwriting Recognition, Sep. 1996, pp. 1-6.

Bakken, David E., "Middleware", Encyclopedia of Distributed Computing, 2001, pp. 1-5, Kluwer Academic Press.

Blafore, Bonnie, "Lower commissions, fewer amenities", Better Investing, Feb. 2003, pp. 50-51, vol. 52, Iss. 6, Madison Heights.

Burnett, John, "Depository Bank Endorsement Requirements", BankersOnline.com, Jan. 6, 2003, pp. 1-3.

"Check 21—The check is not in the post", RedTitan Technology, 2004, pp. 1-3.

De Queiroz, Ricardo et al., "Mixed Raster Content (MRC) Model for Compound Image Compression", Corporate Research & Technology, Xerox Corp., pp. 1-12.

Dinan, R.F. et al., "ImagePlus High Performance Transaction System", IBM Systems Journal, 1990, pp. 421-434, vol. 29, No. 3.

"Direct Deposit Authorization Form", University of Massachusetts—Amherst, 2003.

Eschmeier, Prof. Dr. Jörg et al., "Integrated Data, Message, and Process Recovery for Failure Masking in Web Services", Dissertation zur Erlangung des Grades des Doktors der Ingenieurwissenschaften der Naturwissenschaftlich-Technischen Fakultät I der Universität des Saarlandes, Jul. 2005, pp. 1-146, Saarbrücken.

"Full Service Direct Deposit", Automatic Data Processing, Inc., 2001, pp. 1-2.

Gupta, Amar et al., "An Integrated Architecture for Recognition of Totally Unconstrained Handwritten Numerals", International Journal of Pattern Recognition and Artificial Intelligence, Jan. 1993, pp. 757-773, vol. 7, No. 4, World Scientific Publishing Company.

Hartley, Thomas, "Banks check out new image", Business First, Jul. 16, 2004, pp. 1-3, vol. 20, Iss. 43, Buffalo.

Heckenberg, Daniel, "Using Mac OS X for Real-Time Image Processing", 2003, pp. 10-1-10-10, The University of New South Wales.

Johnson, Jennifer J., "12 CFR Part 229: Regulation CC: Availability of Funds and Collection of Checks", Federal Reserve System, Dec. 22, 2003, pp. 1-89.

Knestout, Brian P. et al., "Banking Made Easy", Kiplinger's Personal Finance, Jul. 2003, pp. 44-47, vol. 57, Iss. 7, Washington.

Masonson, Leslie N., "Check truncation and ACH trends—automated clearing houses", Healthcare Financial Management, Jul. 1993, pp. 1-2, Healthcare Financial Management Association/Gale Group.

Mohl, Bruce, "Banks Reimbursing ATM Fees to Compete with Larger Rivals", Boston Globe, Sep. 19, 2004, p. E.1, Boston, Massachusetts.

Palacios, Rafael et al., "Automatic Processing of Brazilian Bank Checks", Machine Vision and Applications, 2002, pp. 1-28.

Ritzer, J.R., "Hinky Dinky helped spearhead POS, remote banking movement", Bank Systems & Equipment, Dec. 1984, pp. 51-54, vol. 21, No. 12.

Rose, Sarah et al., "Best of the Web: The top 50 financial websites", Money, Dec. 1999, pp. 178-187, vol. 28, Iss. 12, New York.

"Two Words Every Business Should Know: Remote Deposit", A Canon White Paper, 2005, pp. 1-7, Canon U.S.A., Inc.

Tygar, J.D., "Atomicity in Electronic Commerce", ACM NetWorker, Apr./May 1998, pp. 32-43, vol. 2.2, Mixed Media.

Wade, Will, "Early Notes: Updating Consumers on Check 21", American Banker, Aug. 10, 2004, pp. 1-3, vol. 153, Iss. 153, New York, NY.

Wade, Will, "Electronic Billing Problem: The E-Check is in the Mail", American Banker, May 19, 2003, 1 page, vol. 168, No. 95, Thomson Media/Gale Group.

Wallison, Peter J., "Wal-Mart Case Exposes Flaws in Banking-Commerce Split", American Banker, Jan. 11, 2002, p. 17, vol. 167, Iss. 8, New York, NY.

White, J.M. et al., "Image Thresholding for Optical Character Recognition and Other Applications Requiring Character Image Extraction", IBM J. Res. Develop, Jul. 1983, pp. 400-411, vol. 27, No. 4.

Zhang, C.Y., "Robust Estimation and Image Combining", Astronomical Data Analysis Software and Systems IV, ASP Conference Series, 1995, pp. 1-5, vol. 77.

\* cited by examiner

SYSTEMS AND METHODS FOR AUTOMATIC BILL PAY ENROLLMENT

CROSS REFERENCE TO RELATED APPLICATIONS

This application is a continuation of U.S. patent application Ser. No. 12/241,433, filed on Sep. 30, 2008, the entire contents of which are hereby incorporated by reference for all purposes.

The patent applications below are hereby incorporated by reference in their entirety:

U.S. patent application Ser. No. 12/241,443, entitled "SYSTEMS AND METHODS FOR AUTOMATIC BILL PAY ENROLLMENT," now abandoned; and U.S. patent application Ser. No. 12/241,454 entitled "SYSTEMS AND METHODS FOR AUTOMATIC BILL PAY ENROLLMENT," now abandoned.

The present patent application is also related to U.S. patent application Ser. No. 11/321,025, entitled "Remote Deposit of Checks", filed Dec. 29, 2005, which is hereby incorporated by reference in its entirety.

BACKGROUND

Bill pay services offer a service to pay a user's bills automatically each pay period. Traditionally, enrolling in a bill pay service involved manually entering or adding payee information for each separate payee. This is often a less than optimal member experience, which requires the user to manually enter information off the bill, including payee name, address, phone number, account number, etc.

In this regard, there is a need for systems and methods that overcome shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for automatic bill pay enrollment are provided. For several embodiments, a system for bill pay enrollment may comprise at least one subsystem that scans a paper bill into a digital image, at least one subsystem that recognizes information on the digital image, and at least one subsystem that uses at least some of the recognized information to enroll a payee into a bill pay system.

Other features and embodiments are described below.

BRIEF DESCRIPTION OF THE DRAWINGS

Systems and methods for automatic bill pay enrollment are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
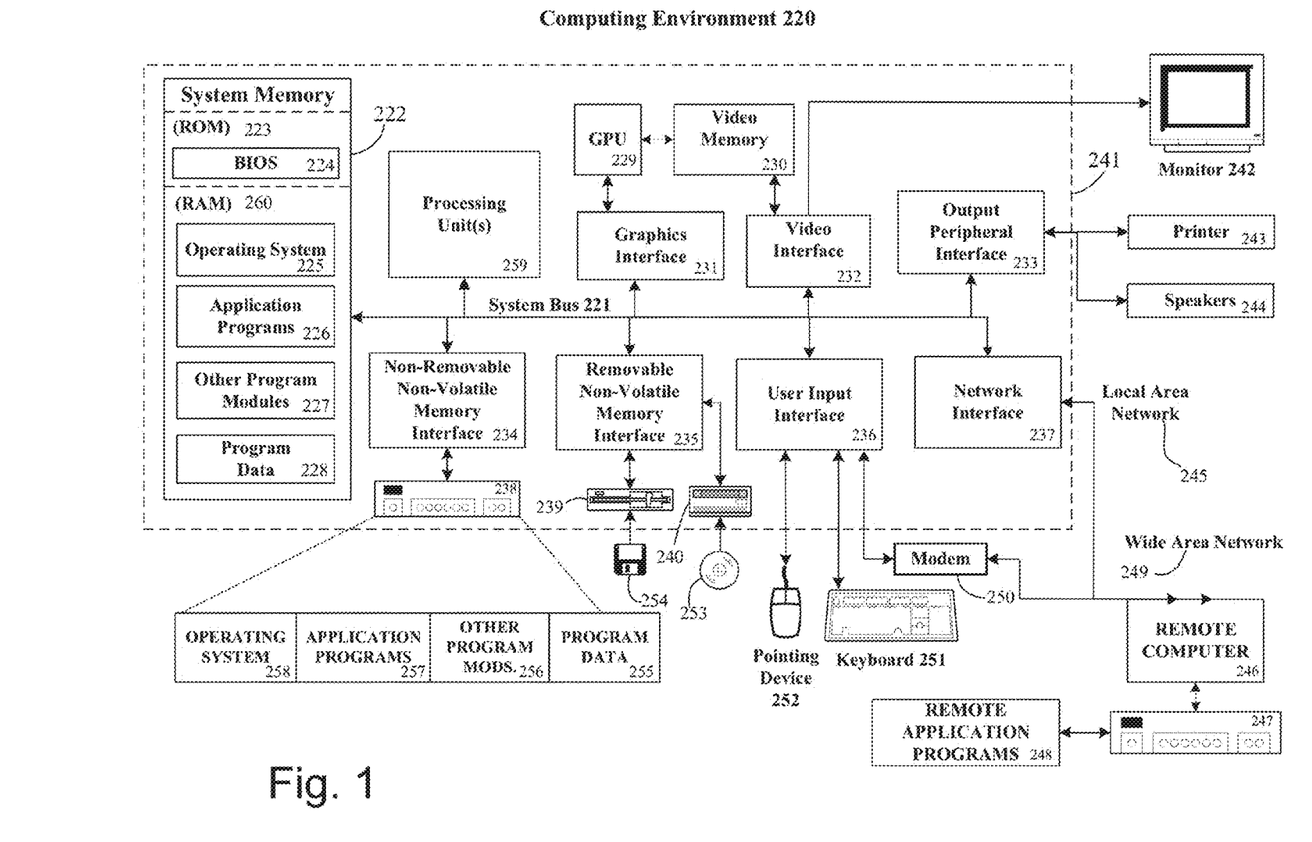
FIG. 1 is a block diagram representing an exemplary computing device suitable for use in conjunction with implementing automatic bill pay enrollment.

Referring next to FIG. 1, shown is a block diagram representing an exemplary computing device suitable for use in conjunction with implementing the processes described below. For example, the computer-executable instructions that carry out the processes and methods for automatic bill pay enrollment may reside and/or be executed in such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a computer game console may also include those items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU), video memory 229, and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
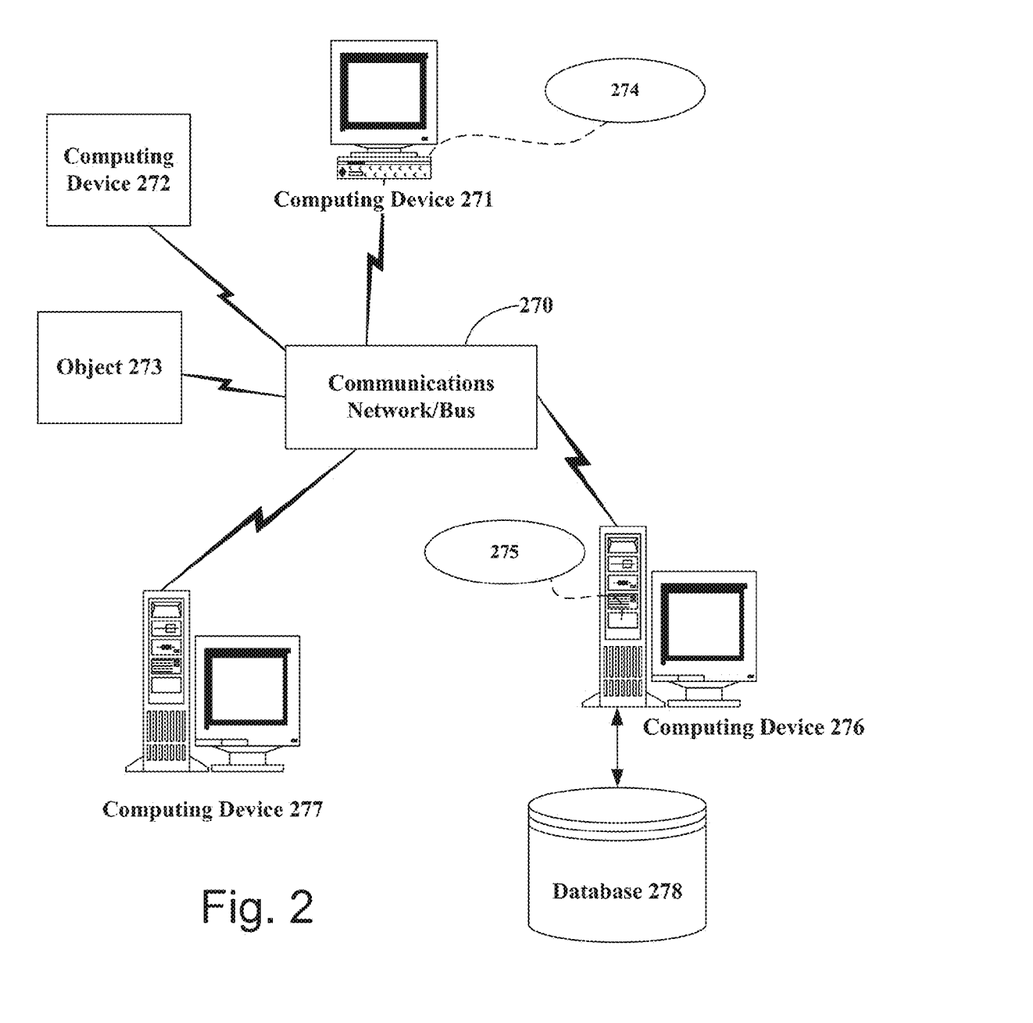
FIG. 2 illustrates an exemplary networked computing environment in which many computerized processes may be implemented to perform automatic bill pay enrollment.

Referring next to FIG. 2, shown is an exemplary networked computing environment in which many computerized processes may be implemented to perform the processes described below. For example, parallel computing may be part of such a networked environment with various clients on the network of FIG. 2 using and/or implementing automatic bill pay enrollment. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
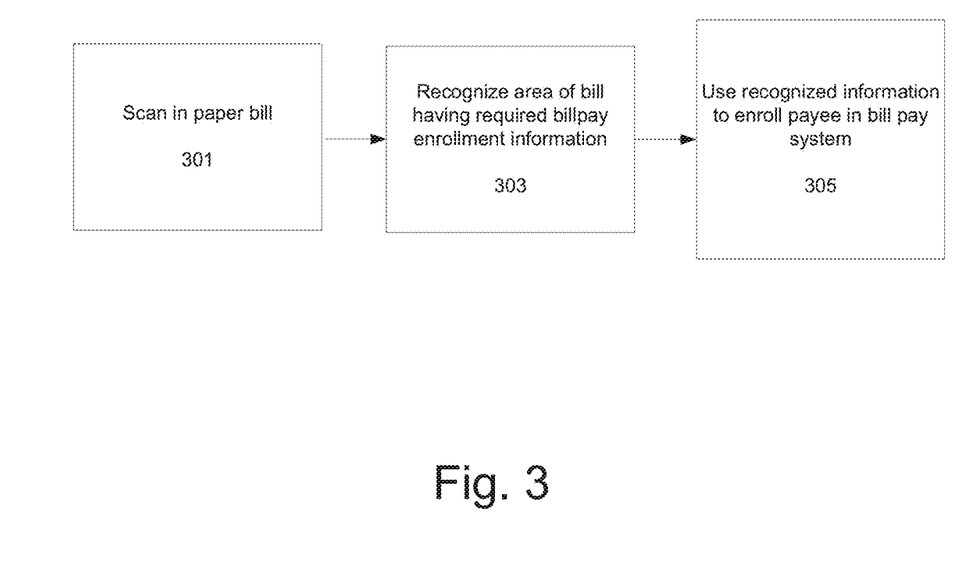
FIG. 3 is a flow chart illustrating an example process for automatic bill pay enrollment.

Referring next to FIG. 3, shown is a flow chart illustrating an example process for automatic bill pay enrollment. First, a user may scan in (301) one or more paper bills received from a payee for example at their home computer or other computing device. The scanning process may also be integrated with a web site interface associated with a bill pay service provider such as a financial institution of the user. For example, the image acquiring and user interface component of the scanning process may be handled according to the scanning process, digital image processing and technology disclosed in previously filed and commonly assigned patent application U.S. patent application Ser. No. 11/321,025, entitled "Remote Deposit of Checks", filed Dec. 29, 2005, which is hereby incorporated by reference in its entirety.

Once the image of the one or more bills is acquired, optical character recognition (OCR) or other image processing technology may be used to recognize (303) identifiers on the bill indicating where relevant information is on the bill to enroll the user in a bill pay system. Examples of this information comprise the payee name, payee address, and account number. Also, other information may also be helpful such as the monthly or minimum payment amount due, due date, etc. This information may be recognized by labels that are commonly used on paper bills such as "account number" being located to the left or above the account number on the paper bill. To the extent the system cannot recognize needed data from the scanned in paper bill, the system may prompt the user for such information during the process.

The recognized information is then used (305) to automatically enroll the payee in the bill pay system. Once the payee is enrolled in the bill pay system, the bill pay system will cause the payee to be continued to be paid on a due date chosen by the user. Alternatively, a due date may be suggested or automatically used by the bill pay system according to a due date acquired from the scanned paper bill. Also, the system may prompt the user (at the user's discretion) to verify the enrollment information before the payee is enrolled in the bill pay system. For multiple bills a user may scan multiple documents in one batch, each document containing billing information for a different payee to be enrolled in the bill pay system, and the process described above may be automatically repeated for each bill or document scanned.

Figure 4:
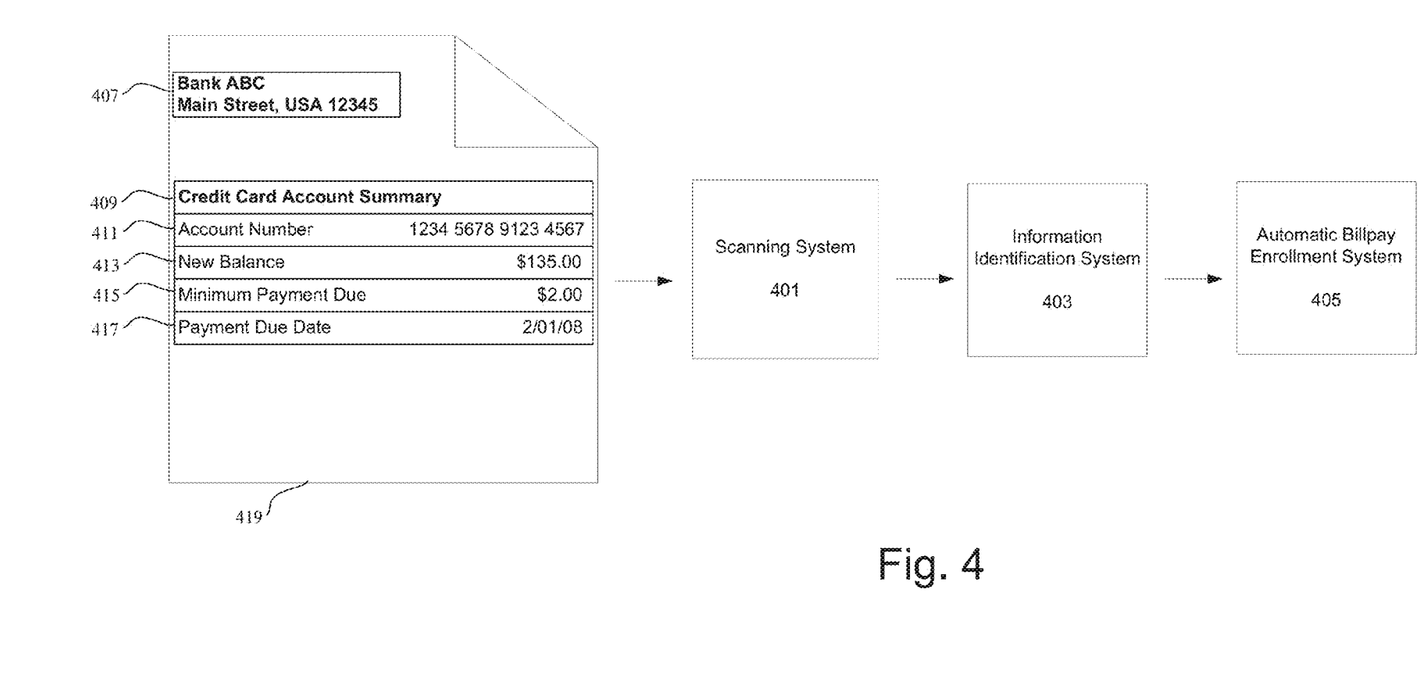
FIG. 4 is a system diagram illustrating an example system for automatic bill pay enrollment.

Referring next to FIG. 4, shown is a system diagram illustrating an example system for automatic bill pay enrollment. Shown is an example paper bill 419. On the paper bill 419, shown is example information that may be recognized and used by the scanning system 401. These items may comprise but are not limited to: the bank or payee name and address 407, a subheading 409, an account number 411, a new balance amount 413, a minimum payment due amount 415, and a payment due date 417.

The scanning system 401 may be similar to that of the scanning system and interface described in the information identification system described in U.S. patent application Ser. No. 11/321,025, entitled "Remote Deposit of Checks", filed Dec. 29, 2005, (which is hereby incorporated by reference in its entirety), wherein the scanning of the document is completed through a web interface that takes control of a home scanner of a user and assists the user through the scanning process. For example, once the paper bill 419 is scanned, it may be presented to the user over a web interface in which the user may identify the borders of the document or key areas on the document containing or associated with relevant information that needs to be captured.

The information identification system 403 identifies the relevant information by using OCR, for example, to recognize the common labels or other identifiers as described above within the document and may search within the proximity of those identifiers for the relevant information.

The automatic bill pay enrollment system 405 then takes the identified relevant information from the information identification system 403 and enters this information into a database used by a bill pay system to enroll the payee in the bill pay system. The automatic bill pay enrollment system 405 may assign the payee a unique identifier in order to identify the payee for subsequent bill paying procedures associated with that payee.

Figure 5:
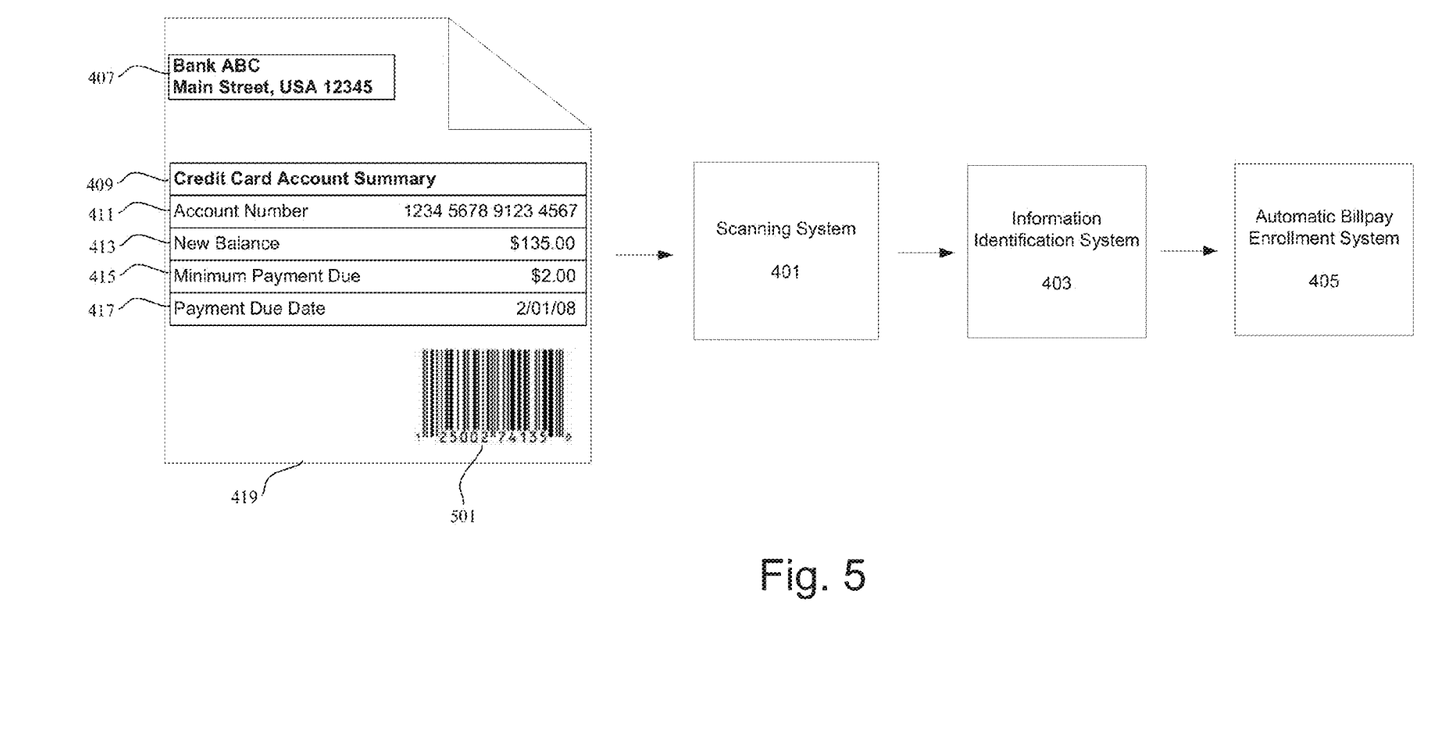
FIG. 5 is a system diagram illustrating an example system for automatic bill pay enrollment using a bar code on a paper bill.

Referring next to FIG. 5, shown is a system diagram illustrating an example system for automatic bill pay enrollment using a bar code on a paper bill. Note the bar code 501 example on the paper bill 419 example. Relevant information for enrolling the payee may be encoded in the bar code 501. In this way a bar code reader or scanner may be part of the scanning system 401 such that the relevant information may be read and input by scanning the bar code instead of or in addition to the entire paper bill 419.

Figure 6:
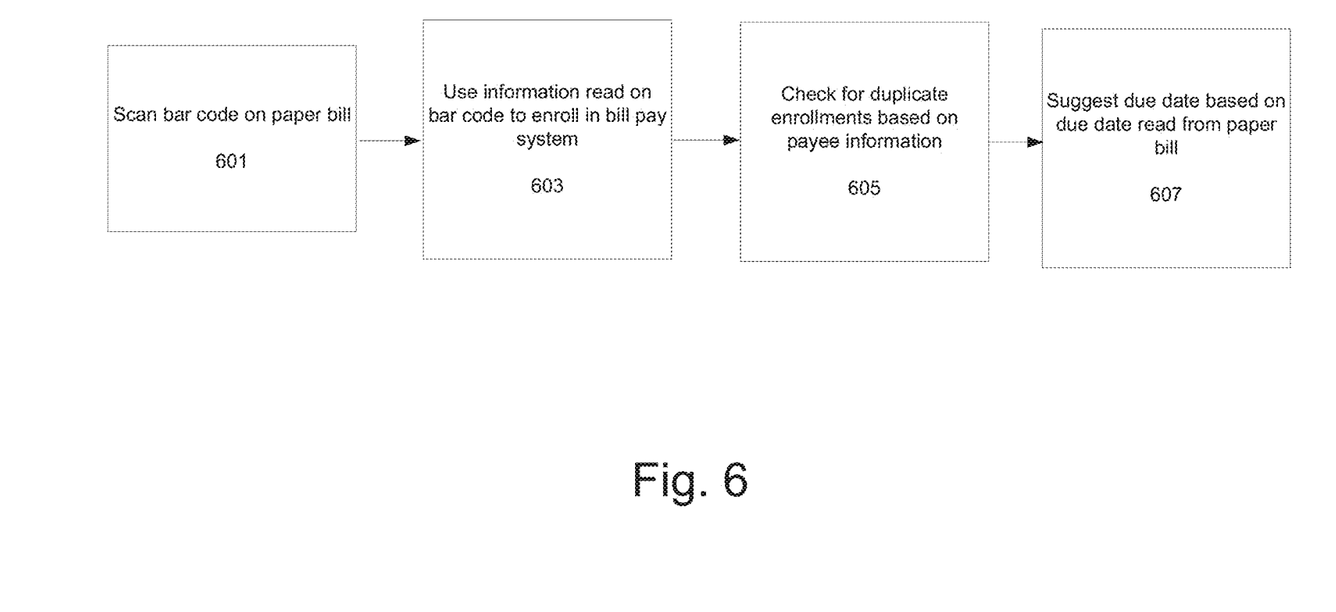
FIG. 6 is a flow chart illustrating an example additional process for automatic bill pay enrollment.

Referring next to FIG. 6, shown is a flow chart illustrating an example additional process for automatic bill pay enrollment. First, a user may scan (601) the bar code as described above such that the relevant information may be read and input by scanning the bar code instead of or in addition to the entire paper bill. The information read from the bar code on the paper bill is then used (603) to enroll the payee in the bill pay system. Additionally, the system may check (605) for duplicate enrollments based on the payee information and then notify the user of such findings or errors. Also, other actions may be taken based upon information read from the scanned paper bill or scanned bar code. For example, a due date may be suggested (607) or used based upon a due date read from the scanned paper bill. Also, marketing messages or notices may be sent to the user based on other information read on from the paper bill. For example, if the bill is for a credit card and an interest rate is read from the paper bill or determined from the payment amounts, etc. then an automatic offer for a lower interest credit card or to transfer balances may be made to the user.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A method of bill pay enrollment, comprising:
   receiving, at a bill pay system, an image of a bill associated with a user of the bill pay system, wherein the bill is a credit card bill;
   identifying, by a processor, a payee, and a due date for the credit card bill by optically recognizing identifiers on the credit card bill, wherein optically recognizing identifiers on the credit card bill comprises:
      locating a label on the image of the bill, and
      searching within a predefined area of the label on the image of the bill;
   checking a user account of the user within a database of the bill pay system for a duplicate enrollment of the payee;
   enrolling the payee into the bill pay system when the duplicate enrollment of the payee is not detected in the database for the user account; and
   in response to the processor identifying an interest rate of a credit card associated with the credit card bill from the image of the bill, automatically transmitting, to the user, an offer for a credit card with a lower interest rate than the credit card associated with the credit card bill.

2. The method of claim 1, wherein the identifiers on the bill include one or more of the following: an account number, a payee name, a payee address, and a payment amount.

3. The method of claim 1, wherein the image of the bill is created using a scanner.

4. The method of claim 1, further comprising:
   identifying a marketing message based on the identifiers on the bill; and
   sending the marketing message to the user.

5. The method of claim 1, wherein, when the user does not have a user account, the method further comprises:
   establishing the user account based at least in part on the identifiers on the bill.

6. The method of claim 1, further comprising:
   assigning the payee a unique identifier to identify the payee for subsequent bill paying procedures associated with the payee.

7. The method of claim 1, further comprising:
   presenting, to the user, the image of the bill.

8. A system for bill pay enrollment, comprising:
   a means for receiving, at a bill pay system, an image of a bill associated with a user of the bill pay system, wherein the bill is a credit card bill;
   a means for searching the image of the bill for information, wherein the information retrieved from the image includes an interest rate of a credit card associated with the credit card bill;
   a means for identifying a payee for the credit card bill using at least a portion of the information retrieved from the image, the means for identifying the payee comprising a means for recognizing identifiers on the bill, wherein recognizing the identifiers on the bill includes: locating a label in the image of the bill, and searching within a proximity of the label in the image of the bill;
   a means for checking a user account of the user within a database of the bill pay system for a duplicate enrollment of the payee;
   a means for enrolling the payee into the bill pay system when the duplicate enrollment of the payee is not detected in the database for the user account;
   a means for identifying a due date for the bill; and
   a means for, responsive to retrieving the interest rate of the credit card associated with the credit card bill from the image of the credit card bill, automatically transmitting, to the user, a credit card with a lower interest rate than the credit card associated with the credit card bill.

9. The system of claim 8, wherein, when the user does not have a user account, the system further comprises:
   a means for establishing the user account based on the information retrieved from the image.

10. The system of claim 8, wherein the information retrieved from the image includes one or more of the following: an account number, a payee name, a payee address, and a payment amount.

11. The system of claim 8, wherein the image of the bill is created using a scanner.

12. The system of claim 8, further comprising:
    a means for identifying a marketing message based on the information retrieved from the image; and
    a means for sending the marketing message to the user account.

13. A method of bill pay enrollment, comprising:
    transmitting a copy of an image of a user's credit card bill to the user over a web interface for identification of borders or areas of interest on the credit card bill by the user;
    locating, by a processor, a label for information on the image of the credit card bill of the user;
    identifying, by the processor, an interest rate of a credit card associated with the credit card bill, a payee, and a due date for the bill by optically recognizing identifiers on the credit card bill;
    determining, by the processor, an enrollment status of the payee in a user account of the user within a database of a bill payment system;
    enrolling, by the processor, the payee into the bill payment system when the payee has not been enrolled in the user account; and
    in response to the processor identifying the interest rate of the credit card from the image of the credit card bill, automatically transmitting, to the user, an offer for a credit card with a lower interest rate than the credit card associated with the credit card bill.

14. The method of claim 13, wherein the identifiers on the credit card bill include one or more of the following: an account number, a payee name, a payee address, and a payment amount.

15. The method of claim 13, further comprising:
    scheduling, in the bill payment system, a payment to the payee based on the due date for the bill.

16. The method of claim 13, further comprising:
    scheduling, in the bill payment system, a payment to the payee based on a payment due date provided by the user.

17. The method of claim 13, wherein the image of the credit card bill is created using a scanner.

18. The method of claim 13, further comprising:
    assigning the payee a unique identifier to identify the payee for subsequent bill paying procedures associated with the payee.

19. The method of claim 13, further comprising:
    presenting, to the user, the image of the credit card bill.

* * * * *